United States Patent [19]

Rottinghaus

[11] Patent Number: 4,577,699

[45] Date of Patent: Mar. 25, 1986

[54] CUSHION MOUNTED DISC WITH INTERCONNECTING SPOOL ASSEMBLY

[76] Inventor: Robert B. Rottinghaus, 4121 S. Canfield Rd., Jesup, Iowa 50648

[21] Appl. No.: 589,201

[22] Filed: Mar. 13, 1984

[51] Int. Cl.⁴ .................. A01B 61/00; A01B 71/04
[52] U.S. Cl. .................................. 172/570; 172/599
[58] Field of Search ............ 172/599, 601, 604, 570, 172/555, 556; 152/52, 47

[56] References Cited

U.S. PATENT DOCUMENTS

| | | | |
|---|---|---|---|
| 2,253,391 | 8/1941 | Ohlendorf | 172/599 |
| 2,270,583 | 1/1942 | Forton | 152/52 X |
| 2,324,065 | 7/1943 | Coffing | 172/580 |
| 2,590,468 | 3/1952 | Schermuly | 172/601 |
| 4,016,935 | 4/1977 | Miller | 172/601 |
| 4,275,791 | 6/1981 | Rottinghaus | 172/570 |

Primary Examiner—Richard J. Johnson
Attorney, Agent, or Firm—Emrich & Dithmar

[57] ABSTRACT

In a disc harrow implement, each of a plurality of disc blades is provided with a conical hub having a center aperture through which an arbor bolt is inserted along the length of the implement. First and second sections of a spool, or hub, positioned on the arbor bolt include respective facing, complementary, conical end portions positioned immediately adjacent opposite faces of the conical hub of the disc. The end portion of the first spool section is provided with a plurality of spool spacer pins around the periphery thereof. Similarly, the hub portion of the disc is provided with a plurality of peripheral apertures around the center aperture through which the spacer pins are inserted so as to abut the end portion of the second spool section when the disc is positioned between the respective spool sections. First and second resilient spacer members are respectively positioned between the respective conical portions of the disc and the first and second spool sections. The interconnecting spool assembly substantially increases the axial strength of the disc harrow and permits the disc blade to flex laterally and vertically relative to its axial support members. Each of the first and second resilient spacer members may be provided with a shoulder extension such that the disc blade is entirely encompassed by the resilient spacer members and is isolated from the interconnecting spool assembly in eliminating metal-to-metal contact therein for increased disc protection. One embodiment provides for selectively controlling the degree of flexibility in the axially aligned disc support members to accommodate various types of terrain and a range of disc blade gauges.

12 Claims, 6 Drawing Figures

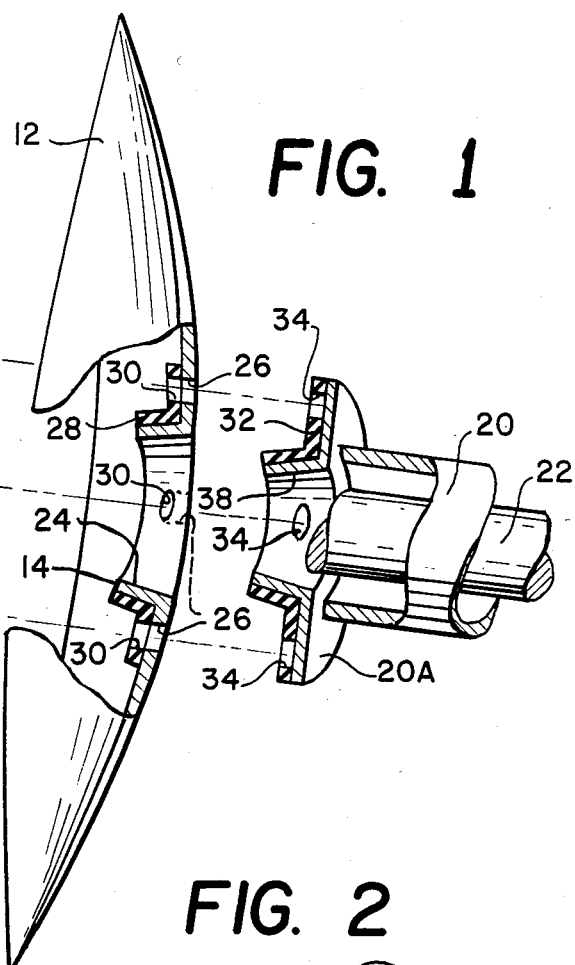
FIG. 1
FIG. 3
FIG. 2
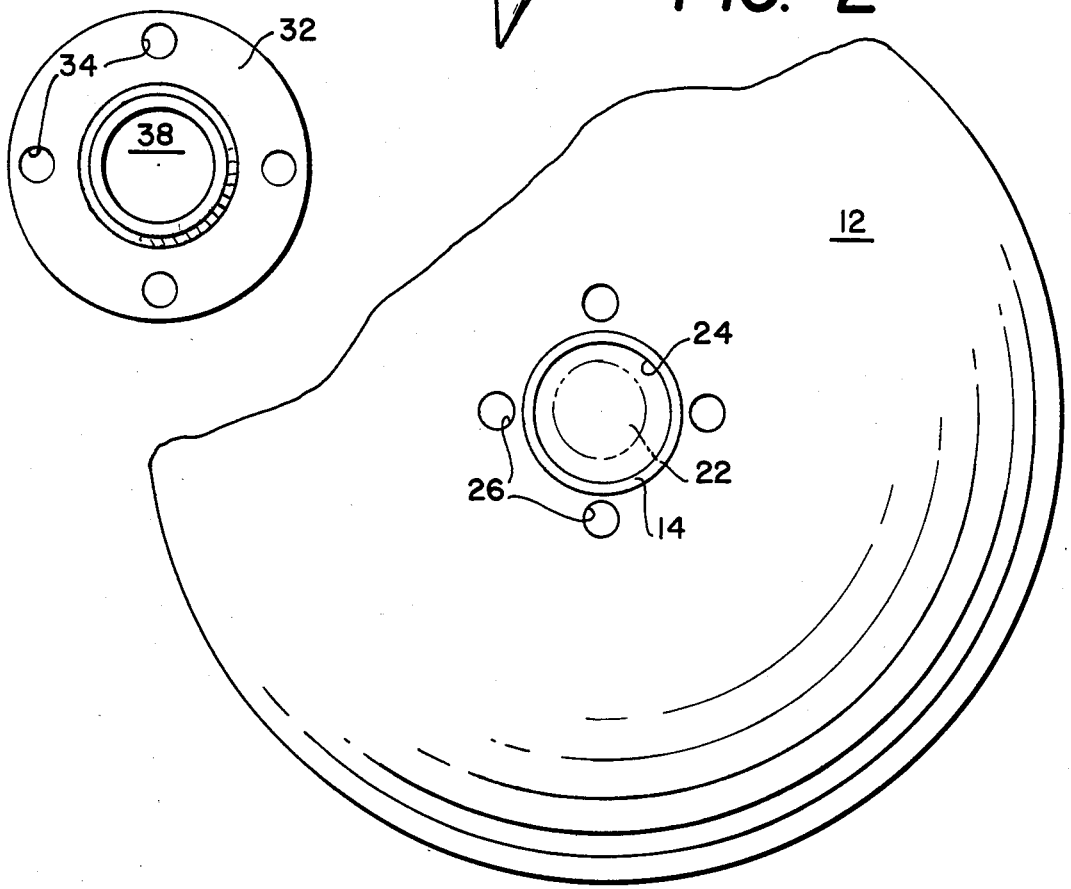

CUSHION MOUNTED DISC WITH INTERCONNECTING SPOOL ASSEMBLY

BACKGROUND OF THE INVENTION

This invention relates generally to ground-working disc implements and is particularly directed to an arrangement which allows for deflection of individual disc blades in a multi-disc harrow implement.

Discs used in tilling the soil are necessarily of relatively thin metal and include a sharp edge around the periphery thereof. In the normal course of operation, these discs impact obstructions in the field, such as rocks, which lie below the surface and remain unseen. Although typically made of a hard steel, such impact will inevitably result in the dulling or breaking of discs and frequently leads to damage to the disc support structure, i.e., the gang bolt upon which the discs are positioned. This, of course, necessitates equipment repair or replacement. Ideally, a disc mounting arrangement would provide for the stable tracking of the disc through the tilled soil while permitting the disc to be freely deflected upon impact with an obstruction.

The prior art discloses various approaches directed toward yieldable mountings for disc harrows. U.S. Pat. No. 2,253,391 to Ohlendorf discloses one such approach making use of resilient means in the form of washers positioned between the faces of the discs and facing spools positioned on a gang bolt. U.S. Pat. No. 2,275,791, issued in the name of the present inventor, discloses another approach in which yieldable biasing means hold the individual disc blades in a normal working position. When the disc blade impacts an obstruction in the field such as a rock, the force is transmitted to the biasing means which yields and therefore allows the individual disc blade to yield, thereby preventing structural damage to the disc blade. The biasing means is in the form of a donut-shaped spring in combination with interconnected wedge blocks. Another disc gang assembly is disclosed in U.S. Pat. No. 4,420,048 to Peterson. These and other approaches in the prior art have suffered from various shortcomings such as high complexity and associated excessive cost and have still not been able to completely eliminate the possibility of structural damage to a disc harrow upon impact with an obstruction in the field.

The present invention is intended to overcome the aforementioned limitations of the prior art by providing a disc mounting arrangement wherein the disc is insulated from direct impact with its associated disc mounting assembly which provides for the free deflection of the disc upon impact with an obstruction.

OBJECTS OF THE INVENTION

Accordingly, it is an object of the present invention to provide an improved mounting arrangement for a disc in a disc harrow implement.

It is another object of the present invention to provide a mounting arrangement for a disc harrow which offers high strength while allowing for the free displacement of a disc upon impact with an obstruction.

Still another object of the present invention is to provide a mounting arrangement which provides increased protection from impact damage for a disc assembly as well as the gang bolt upon which it is mounted.

A further object of the present invention is to provide a disc mounting arrangement for reducing destructive disc blade vibrations upon impact with an obstruction in the field being tilled.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a partially cut away, exploded perspective view of a cushion mounted disc with an interconnecting spool assembly in accordance with one embodiment of the present invention;

FIG. 2 is a fragmentary view of a disc for use with the interconenting spool assembly shown in FIG. 1;

FIG. 3 is a plan view of a resilient spacer member for use with the cushion mounted disc with an interconnecting spool assembly as shown in FIG. 1;

DETAILED DESCRIPTION OF THE PREFERRED EMBODIMENTS

Figure 4:
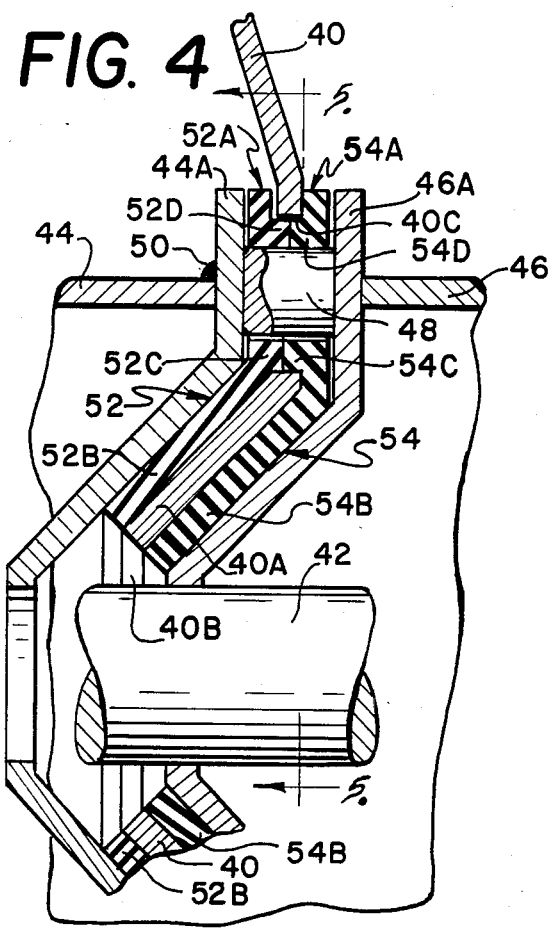
FIG. 4 is a sectional view showing a portion of an interconnecting spool assembly with a cushion mounting for a disc in accordance with another embodiment of the present invention.

Referring to FIG. 1, there is shown a partially cut away, exploded perspective view a disc with a spool mounting assembly 10 in accordance with the present invention.

The disc 12 is of a generally concave shape having a sharp peripheral edge and a center aperture 24. Positioned adjacent the center aperture 24 of the disc 12 is a disc hub 14 having a generally frusto-conic shape. The conical portion of the disc hub 14 extends outward from the disc 12 on the concave side thereof. Located within the disc 12 around the periphery of the hub portion 14 thereof are a plurality of apertures 26. As shown in FIG. 1, four apertures are positioned around the center aperture 24 in disc 12.

Positioned on one side of the disc 12 is a first spool, or hub, section 18 which includes an open cone-shaped end portion 18A. Extending from the cone-shaped end portion 18A of the first spool section 18 around the periphery thereof are a plurality of spacer pins 36. The spacer pins 36 are integral with the end portion of the first spool section 18 and the entire combination may be formed as a single unit such as by stamping. Positioned between the cone-shaped end portion 18A of the first spool section 18 and the disc hub 14 is a first resilient spacer member 28. Spacer member 28 includes an outer, peripheral portion having a plurality of apertures 30 therein and a center portion which is positioned upon the conical portion of the disc hub 14 and also includes a center aperture therein. When the first resilient spacer member 28 is properly positioned upon the disc hub 14, the spacer member apertures 30 are aligned with corresponding apertures 26 in the disc 12. With the corresponding sets of apertures thus aligned, each of the spacer pins 36 on the end portion of the first spool section 18 may be inserted within a respective set of apertures with the peripheral edge of the cone-shaped end portion 18A of the first spool section 18 positioned in abutting contact with the first resilient spacer member 28.

From FIG. 1, it can be seen that the end portion 18A of the first spool section 18 and the disc hub 14 have complementary conical configurations such that the disc hub 14 may be inserted within the cone-shaped end portion 18A of the first spool section 18. A second spool section 20 includes a cone-shaped end portion 20A which may similarly be inserted within the disc hub 14 of the disc 12. Positioned between the disc hub 14 and the end portion 20A of the second spool section is a second resilient spacer member 32. Like the first spacer member 28, the second resilient spacer member 32 includes a center aperture 38 and a plurality of apertures 34 around the periphery thereof. With the second resilient spacer member 32 positioned upon the end portion 20A of the second spool section 20 in tight fitting relation and apertures 34 aligned with corresponding apertures 30, 26, in the first spacer member 28 and the disc 12, the spool spacer pins 36 may be positioned within apertures 34. With the resilient spacer members 28, 32 positioned on respective sides of disc 12 and with the first and second spool sections 18, 20 positioned in abutting contact with a respective spacer member, the distal ends of the spool spacer pins 36 on the end portion of the first spool section 18 are positioned in abutting contact with the generally flat periphery of the end portion 20A of the second spool section 20.

Positioned within the center apertures of the first and second spool sections, the first and second resilient spacer members, and the disc is an arbor bolt 22. Positioned along the length of the arbor bolt 22 may be a plurality of discs, each with an interconnecting spool mounting assembly 10 in accordance with the present invention. On one end of the arbor bolt 22 is positioned retaining means, such as a nut (not shown), for maintaining a plurality of discs in position along the length of the arbor bolt 22. Similarly, a plurality of brackets including bearing means (not shown) would be rotationally coupled to the arbor bolt 22 at various points along the length thereof for mounting the gang of discs to an implement frame (not shown). In order to provide rotational synchronization of the various discs positioned on the arbor bolt, each of the first and second spool and disc combinations may be provided with a square-shaped center aperture for use with an arbor bolt having a square transverse cross section as is well known in the art.

As shown in FIG. 2, in one embodiment of the present invention the disc 12 includes four circular apertures 26 equally spaced around the center aperture 24 of the disc. The present invention is not limited in application to four of such apertures, but may make use of virtually any number of apertures depending upon the number of spool spacer pins. Similarly, it is not essential that the disc center aperture 24 be circular. For example, the present invention will work equally well with a generally square-shaped center aperture in which is positioned an arbor bolt having a square transverse cross section as described above.

FIG. 3 is a plan view of the second resilient spacer member 32. The second resilient spacer member 32 includes a center cone-shaped portion which may be slightly smaller than that of the first resilient spacer member 28 as shown in FIG. 1. Equally spaced around the periphery of the flat portion of the second spacer member 32 are a plurality of circular apertures 34. A larger circular aperture 38 is positioned in the center of the second spacer member 32. As in the case of the disc 12, the present invention is not limited to the use of circular peripheral and center apertures within the resilient spacer members, but may make use of virtually any shape apertures therein. Immediately adjacent the center aperture 38 of the second spacer member 32 is located the frusto-conical center portion of the spacer member which is inserted in tight-fitting contact with the complementary configured portion of the disc hub 14.

It should be noted that the apertures 26 within disc 12 are larger in cross section than the corresponding spool spacer pins 36 on the end of the first spool section 18. This allows for a certain amount of play in the deflection of the disc 12 along the axis of the arbor bolt 22. This arrangement provides for the relative displacement of the vertically-oriented disc 12 with respect to the horizontally-aligned axis of the arbor bolt 22, which relative displacement may be regulated by the thickness of the frusto conical-shaped first and second resilient spacer members 28, 32 as described below. When assembled, the arbor bolt nut (not shown) on the end of the arbor bolt 22 is secured with a torque equal to that of a conventional disc. The disc 12 is then completely encased in a cushion of resilient material, which may be made of rubber, and is floating independently of its metal enclosure. The force of the working load on the disc 12 and its deflection is determined by the length of the spool spacer pins 36 and the thickness and resilience of the shock absorbing material used in the first and second spacer members 28, 32. The interconnecting spool design of the present invention not only substantially increases the axial strength of the disc supporting shaft by increasing its effective diameter, but also permits the individual discs to be displaced laterally and vertically relative to one another with respect to the axis upon which the discs are mounted. Increasing the strength of the disc support shaft is particularly important where as many as ten discs may be positioned on a single arbor bolt.

Referring to FIG. 4, there is shown another arrangement in accordance with the present invention for mounting a disc 40 within a resilient cushion structure between adjacent spool sections. FIG. 4 is a sectional view of the disc 40 showing the various apertures therein and the means for mounting the disc between first and second spool sections 44, 46. The disc 40 includes a center portion 40A defining a center aperture 40B therein in which is positioned an arbor bolt 42. The disc 40 further includes a plurality of smaller apertures 40C positioned around the center aperture 40B thereof. Similar mounting arrangements are provided for other apertures 40C within the disc 40, but are omitted from FIG. 4 for simplicity sake.

The first and second spool sections 44, 46 are provided with similarly configured, parallel-aligned flanges 44A, 46A. A spool spacer pin 48 is positioned within the aperture 40C within disc 40 and is integral with and coupled to the flange 44A of the first spool section 44. The support pin 48 may be connected to the flange 44A by conventional means such as by a weldment 50. Positioned on respective lateral portions of the disc 40 and between adjacent first and second spool flanges 44A, 46A are first and second resilient spacer members 52, 54. The first resilient spacer member 52 includes a peripheral portion 52A and a center portion 52B. Similarly, the second resilient spacer member 54 includes a peripheral portion 54A and a center portion 54B. Each of the resilient spacer members includes a plurality of apertures corresponding to a respective aperture 40C in the disc 40. The respective center portions of the first and second spacer members 52B, 54B include protruding shoulder portions 52C, 54C. Similarly, the peripheral portions of the first and second spacer members 52A, 54B are respectively provided with protruding shoulder portions 52D, 54D. These facing protruding shoulder portions of the first and second spacer members 52, 54 are in abutting contact with each other when properly positioned between the first and second spool sections 44, 46. In addition, respective shoulder portions of the first and second spacer members 52, 54 are positioned between the spool spacer pin 48 and adjacent portions of the disc 40 defining the aperture 40C therein. By completely enclosing the disc 40 within and between the first and second resilient spacer members 52, 54, the disc 40 is completely isolated from the first and second spool section 44, 46 between which it is mounted. This arrangement eliminates metal-to-metal contact in the disc mounting arrangement of the present invention and thus provides a dampening mechanism for the disc 40 upon initial impact with an object, such as a rock, in reducing disc vibrations caused by such impact and the possibility of disc and arbor bolt damage and destruction associated therewith.

Figure 5:
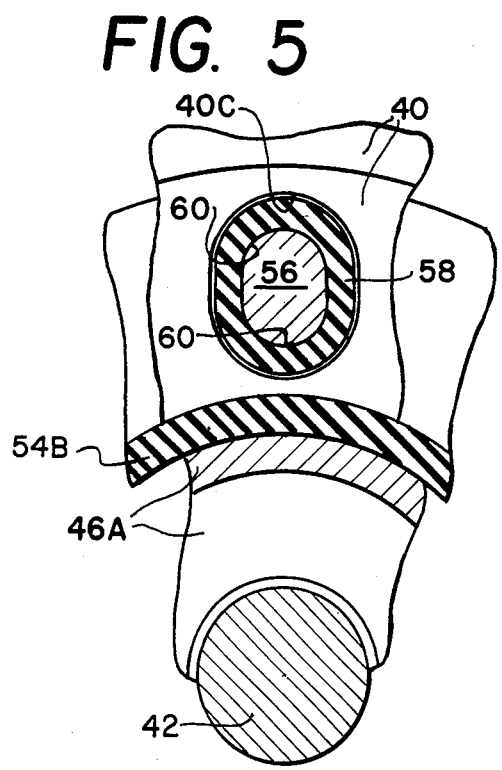
FIG. 5 is a sectional view of the combination of a resilient member and an oblong spool spacer pin for use in the interconnecting spool assembly with a resilient disc mounting of the present invention.

Referring to FIG. 5, there is shown a sectional view of the first resilient spacer member 52 through which is inserted a spool spacer pin 56. The generally elongated cross section of the spool spacer pin 56 provides a greater area of contact and engaging surface between the spool spacer pin 56 and the matching oblong aperture 60 within the disc. The protruding shoulder of resilient material 58 in the spacer member 52 is arranged in tight-fitting relation between the outer circumference of the oblong spacer pin 56 and the inner circumference of the oblong aperture 60 in the disc blade. In a preferred embodiment, the protruding shoulder of resilient material 58 is one-half the thickness of the disc. Two resilient spacer members are used, with each positioned on a respective side of the disc, for diverting impact shock from the disc. Each resilient spacer thus provides one-half the material for the compressed support and separation of the support pin 56 and that portion of the disc defining the aperture within which the spacer pin 56 is positioned.

Figure 6:
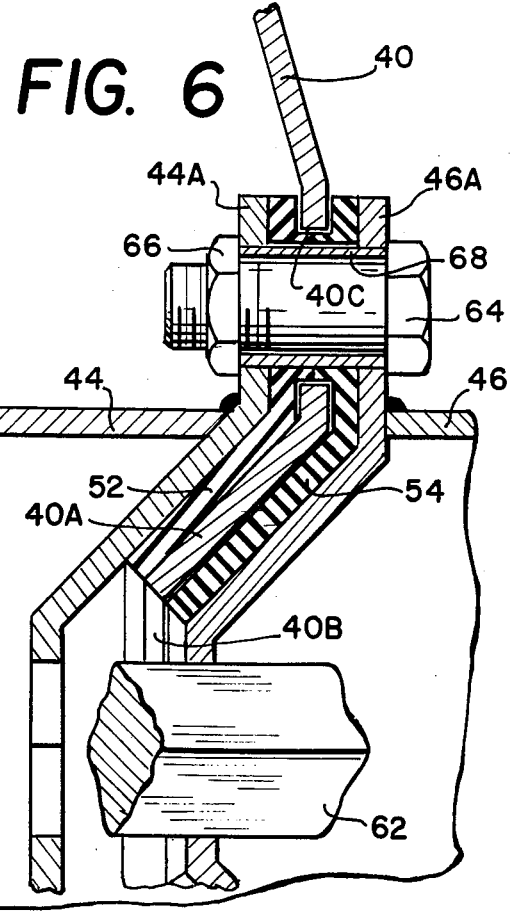
FIG. 6 is a sectional view showing a portion of an interconnecting spool assembly with a cushion mounting for a disc which permits the flexibility of the disc mounting arrangement to be selectively varied.

Referring to FIG.6, there is shown another embodiment of the present invention which provides an adjustment capability for varying the flexibility of the interconnecting spool assembly. In FIG. 6, the disc 40, which includes a center portion 40A, is positioned between and entirely encapsulated within the first and second resilient spacer members 52, 54. The first and second resilient spacer members 52, 54 are, in turn, positioned in an abutting manner between the respective flanges 44A, 46A of the first and second spool sections 44, 46. In the embodiment of FIG. 6, rather than interposing a spacer pin between the two flanges which is securely coupled to only one of the flanges as in the case of the spool spacer pin 48 in FIG. 4, a bolt 64 is inserted through the disc aperture 40C as well as the corresponding, aligned apertures in the first and second resilient spacer members 52, 54 and spool flanges 44A, 46A. Bolt 64 is securely maintained in position by means of a nut 66 threadably engaging one end thereof.

A plurality of bolts 64 are positioned within respective apertures 40C which surround the center aperture 40B of disc 40. By tightening the combination of bolt 64 and nut 66, the first and second resilient spacer members 52, 54 may be compressed, as desired. By selectively compressing the first and second resilient spacer members the flexibility of the interconnecting spool assembly comprised primarily of first and second spool sections 44, 46 positioned on respective sides of disc 40 may be set, as desired. For example, by tightening nut 66 on bolt 64 and thereby compressing the first and second resilient spacer members 52, 54, the flexibility of the interconnecting spool assembly may be reduced. Similarly, loosening of the nut and bolt combination will provide a greater degree of play between the facing first and second flanges 44A, 46A and permit the first and second resilient spacer members 52, 54 to provide greater flexibility in the interconnecting spool assembly. By providing the farmer with the capability to selectively adjust the flexibility in the disc harrow implement, more reliable disc operation may be realized. For example, in rocky terrain the nut and bolt combination may be loosened to provide greater interconnecting spool assembly flexibility in order to reduce the likelihood of damage to the ground engaging disc blades and arbor bolt. It may also be desirable to selectively establish disc harrow implement flexibility in the aforementioned manner according to the gauge, or thickness, of the discs being used. For example, a thinner disc blade would typically require more flexibility in its mounting and support assembly in order to reduce the possibility of damaging the disc. In addition, the plurality of bolts 64 coupling facing spool flanges 44A, 46A increase the strength of the arbor bolt mounting arrangement by increasing the effective diameter of the disc mounting and support assembly.

As shown in FIG. 6, the arbor bolt 62 may be generally square in transverse cross section. Each of the spool flanges 44A, 46A along the length of the arbor bolt 62 may similarly be provided with generally square apertures to permit them to be mounted in tight fitting relation along the length of the arbor bolt 62. With each of the spool sections 44, 46 securely coupled to the disc 40 by means of spacer bolts 64, rotation of the disc 40 in response to contact with the ground when pulled thereacross will result in a corresponding rotation in the arbor bolt 62. In this manner, all of the discs will rotate at the same angular speed. When this occurs, each of the spool sections 44, 46 will similarly rotate at the same angular speed and all discs will be synchronized with each other and with the rotation of the arbor bolt 62. Thus, a square arbor bolt 62, or a similarly configured arbor bolt capable of engaging the center aperture of the discs positioned thereon, may provide synchronization of all discs on the disc harrow implement. With all disc blades rotating at the same angular speed, the spacer bolts 64 will be subjected to a reduced transverse sheering force between the disc 40 and the adjacent spool section flanges 44A, 46A. However, if as shown in FIG. 4, the arbor bolt 42 is circular in transverse cross section, the arbor bolt 42 will not provide synchronous rotation of the disc blades positioned along the length thereof. In this case, the spacer bolts 64 may be inserted through the disc 40 and the facing spool flanges 44A, 46A to provide for the synchronization of the disc blades along the length of the circular arbor bolt 42. It should be noted that as shown in FIG. 4, with a plurality of discs 40 positioned along an arbor bolt 42 having a circular transverse cross section and spool spacer pins 48 positioned between adjacent spool section flanges 44A, 46A, and securely coupled to only one of these flanges, synchronization of disc blade rotation will depend entirely upon the degree to which a nut (not shown) on the end of the arbor bolt 42 is tightened in exerting a longitudinal compressive force upon the various spool sections.

Also shown in FIG. 6 is a bushing 68 positioned within the aligned apertures of the disc 40 and first and second resilient spacer members 52, 54 and through which a spacer bolt 64 is inserted. The length of bushing 68 may be selected to provide a given resiliency or flexibility in the disc mounting assembly. For example, increasing the length of the bushing 68 will provide increased flexibility, while reducing the length of the bushing will result in a corresponding reduction in flexibility. In this manner, bushings of various, selected lengths may be used to provide a flexibility calibration capability in the cushion-mounted disc assembly of the present invention.

There has thus been shown a cushion-mounted disc with an interconnecting spool assembly for encapsulating the disc hub within a resilient cushion assembly on an arbor bolt, wherein direct metal to metal contact in the disc mounting is avoided. Adjacent, interconnecting spool sections positioned on respective sides of the disc blade with resilient spacer members located between the disc blade and each spool section provide a disc mounting arrangement which permits the disc to be deflected perpendicular to its mounting axis and allows it to absorb large impact forces without damage to either the disc or the supporting arbor bolt.

While particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A yieldable disc assembly for use on a shaft rotatably mounted to an implement, said assembly comprising:
    a disc having a conical hub portion with a center aperture within which said shaft is positioned and a plurality of peripheral apertures spaced around said center aperture;
    a first spool section positioned on said shaft adjacent a first lateral portion of said disc, said first spool section including a first end portion adapted to receive said hub in complementary tight-fitting relation and including a plurality of spacer means extending therefrom;
    a second spool section positioned on said shaft adjacent a second, opposing lateral portion of said disc, said second spool including a second end portion adapted to receive said hub in complementary tight-fitting relation; and
    first and second resilient spacer members respectively positioned between said disc hub and said first and second spool sections and around the center aperture of said disc, each of said resilient spacer members including a center aperture aligned with the center aperture of said disc and a plurality of peripheral apertures positioned around said center aperture for receiving a respective spacer means therein, wherein a distal end of each of said spacer means is maintained in flush alignment with a peripheral surface on said second end portion of said second spool section, wherein each of said first and second resilient spacer means further includes an outer, generally flat peripheral portion containing said outer peripheral apertures and abutting facing, generally flat surfaces of said disc and an inner conical portion positioned in tight fitting relation with the conical hub portion of said disc.

2. A disc gang assembly as in claim 1 wherein each of said discs and said resilient spacer means includes a plurality of peripheral apertures positioned around a respective center aperture therein and each of said first and second spool sections includes a plurality of peripheral apertures on respective ends thereof, said disc gang assembly further including adjustable means comprising a plurality of bolts positioned within said spacer means and aligned peripheral apertures of said discs, said resilient means, and said first and second spool sections.

3. A disc gang assembly as in claim 1 further wherein said spacer means comprises a plurality of bushings, each positioned within the aligned peripheral apertures of said discs, and resilient means, and said first and second spool sections, wherein the flexibility of said disc gang assembly is determined by the length of said bushings.

4. A disc gang assembly comprising:
    a shaft;
    a plurality of discs positioned in spaced relation along the length of said shaft, each of said discs including a conical hub portion having a center aperture in which said shaft is positioned and a plurality of peripheral apertures positioned around said center aperture;
    a plurality of resilient spacer means each enclosing the hub portion of a respective disc, each of said resilient spacer means including first and second conical resilient spacer members positioned on and in abutting contact with respective sides of the hub portion of said disc and including a center aperture in which said shaft is positioned and a plurality of peripheral apertures positioned around said center aperture and aligned with the peripheral apertures of said disc, each of said first and second resilient spacer members further including an outer, generally flat peripheral portion containing said outer peripheral apertures and abutting facing, generally flat surfaces of said disc and an inner conical portion positioned in tight fitting relation with the conical hub portion of said disc; and
    a plurality of first and second spool sections each positioned on a respective side of a disc along the length of said shaft, wherein each of said first and second spool sections includes a conical end portion for engaging in a complementary abutting manner a respective resilient spacer means and, in turn, a respective side of the conical hub portion of a disc and wherein the conical end portion of said first spool section includes a plurality of spacer pins mounted thereto and positioned within aligned peripheral apertures in said disc and said spacer means and in abutting contact with the end portion of said second spool section.

5. A disc gang assembly as in claim 4 wherein said first and second resilient spacer members are comprised of rubber.

6. A disc gang assembly as in claim 4 wherein the center apertures in said disc and said resilient spacer means are circular to accommodate a shaft having a transverse circular cross section.

7. A disc gang assembly as in claims 4 wherein said resilient spacer means includes extended shoulder portions adjacent the peripheral apertures therein for completely enclosing a respective spacer pin positioned therein.

8. A disc gang assembly as in claim 4 wherein each of said spacer pins has a noncircular transverse cross section and each of said peripheral apertures in said resilient spacer means is noncircular.

9. A disc gang assembly as in claim 8 wherein each of said spacer pins has a generally oblong transverse cross section and wherein the elongated surfaces of each of said spacer pins are aligned generally perpendicular to the direction of rotation of said discs.

10. A disc gang assembly as in claim 4 wherein the conical hub portion of said disc is positioned on and extends from a concave lateral surface thereof.

11. A disc gang assembly as in claim 4 wherein said plurality of spacer pins are welded to the conical end portion of said first spool section.

12. A disc gang assembly as in claim 4 wherein said shaft has a generally square transverse cross section, the center aperture of each of said discs is generally square, and each of said first and second spool sections includes a generally square aperture extending through the center thereof and adapted to securely engage said shaft for synchronizing the rotation of all of said discs.

* * * * *

UNITED STATES PATENT AND TRADEMARK OFFICE
CERTIFICATE OF CORRECTION

PATENT NO. : 4,577,699
DATED : March 25, 1986
INVENTOR(S) : Robert B. Rottinghaus It is certified that error appears in the above—identified patent and that said Letters Patent is hereby corrected as shown below:

Column 8, line 32, "and" (first occurrence) should be -- said --

Column 9, line 14, "claims" should be -- claim --.

Signed and Sealed this

Third Day of June 1986

[SEAL]

Attest:

DONALD J. QUIGG

Attesting Officer

Commissioner of Patents and Trademarks